United States Patent
Leiber et al.

(10) Patent No.: US 6,512,453 B1
(45) Date of Patent: Jan. 28, 2003

(54) MOTOR VEHICLE ABS-INTEGRATED BRAKE PAD WEAR INDICATION APPARATUS

(75) Inventors: Heinz Leiber, Oberriesingen (DE); Dietmar Walter, Winnenden-Schelmenholz (DE); Arnold Federer, Goetzis (AU)

(73) Assignees: DaimlerChrysler AG, Stuttgart (DE); Richard Hirschmann GmbH, Rankweil-Brederis (AT)

( * ) Notice: Subject to any disclaimer, the term of this patent is extended or adjusted under 35 U.S.C. 154(b) by 0 days.

(21) Appl. No.: 08/268,532

(22) Filed: Jul. 6, 1994

(30) Foreign Application Priority Data

Jul. 6, 1993 (DE) .......................... 43 22 440

(51) Int. Cl.[7] ................................ B60Q 1/00
(52) U.S. Cl. ................ 340/454; 340/439; 188/1.11; 116/208; 701/36; 701/70
(58) Field of Search ................ 340/431, 438, 340/439, 454, 453, 475; 188/1.11; 116/208; 701/70, 36

(56) References Cited

U.S. PATENT DOCUMENTS 4,866,419 A * 9/1989 Kyrtsos et al. ............ 340/443
4,876,528 A * 10/1989 Walker et al. ............. 340/442
5,125,483 A * 6/1992 Kitagawa et al. ......... 188/1.11
5,339,069 A * 8/1994 Pennec et al. ............. 340/454

FOREIGN PATENT DOCUMENTS

| DE | 2606012 | 8/1977 |
| DE | 3433254 | 5/1986 |
| DE | 3829949 | 3/1990 |
| EP | 0357922 | 3/1990 |
| GB | 1572133 | 7/1980 |
| GB | 2202016 | 9/1988 |

* cited by examiner

*Primary Examiner*—Daniel J Wu
(74) *Attorney, Agent, or Firm*—Crowell & Moring LLP

(57) ABSTRACT

A device for ABS-integrated brake pad wear indication in a motor vehicle in which all line paths are constructed to avoid current loops and induction surfaces. All the wheel speed and pad wear signal lines respectively lead to the ABS or ABS/ASR control unit in a single strand or are combined at least via common fixings, grommets, intermediate connecting plugs and a single terminal connecting plug. Owing to coding of different warning signals for, e.g., ABS, ASR and brake pad wear, the signal connection between the ABS or ABS/ASR control unit and the instrument cluster in the dashboard is reduced to a single line.

3 Claims, 3 Drawing Sheets

MOTOR VEHICLE ABS-INTEGRATED BRAKE PAD WEAR INDICATION APPARATUS

BACKGROUND AND SUMMARY OF THE INVENTION

The present invention relates to an apparatus for ABS-integrated brake pad wear indication in a motor vehicle in which a central ABS or ABS/ASR microcomputer is supplied with wheel speed signals and brake pad wear signals from wheel sensors, devices for indicating fault states and/or brake pad wear such that, at least wheel by wheel, lines which transmit wheel speed signals and brake pad wear signals to the microcomputer are combined or laid in a single strand, are fixed and, if necessary, plugged in.

With only slight modifications, a conventional practicable implementation of brake pad wear indicators in passenger vehicles is performed for example in accordance with FIG. 3. Speed sensor lines 3.1 to 3.4 of wheel speed sensors 1.1 to 1.4 connect to an ABS or ABS/ASR control unit 8 in a plurality of plug-in connectors 7.1, 7.2 and 7.3. Brake wear sensor lines 4.1 to 4.4 of wheel brake pad wear sensors 2.1 to 2.4 connect to the instrument cluster 6 in the dashboard of the vehicle via a connector 5' or directly on the plug-in connector 5 to drive a warning display integrated there before or upon pad wear-out. Over their length, the aforementioned individual lines are provided with individual, respectively doubled plug-in connectors 14', 15', 16' and 17'. Other electrical connections 10a and 10b are provided between the ABS or ABS/ASR control unit 8 and the instrument cluster 6 for the purpose, inter alia, of permitting a plurality of warning displays in the instrument cluster 6 in the event of an error in ABS, ASR and otherwise. The lines 3.1 to 3.4, 4.1 to 4.4 and 10a, 10b are led individually via or through holders and, provided in duplicate in each case, grommets 19', and fixed.

This conventional approach is expensive and is susceptible to high electromagnetic compatibility (EMC) interference during operation of radio telephones in or in the vicinity of vehicles so equipped.

DE 26 06 012 A1 describes a sensor arrangement for an antiblock device for vehicle brakes, in which the pulse generator sampling the wheel speed is electrically connected to the sampling circuit of a brake pad wear indicator. Using this arrangement, a wheel speed signal and a brake pad wear signal are transmitted from a wheel to the corresponding control unit via the same two wires of a single line.

DE 34 33 254 A1 describes a device for testing the serviceability of a slip-controlled brake system. In this system, all the lines which come from the wheels and transmit wheel speed signals and/or control signals are led to a plug-in connector which is normally connected to the control unit for the purpose of slip-controlled vehicle braking.

DE 38 29 949 A1 discloses, inter alia, a control device for operating an electric hydraulic service brake device in a motor vehicle. It comprises an electronic ABS control unit which processes individual wheel speed signals and other inputs for the purpose, inter alia, also of receiving and of processing signals from brake pad wear transmitters on braked wheels. Signal lines from sensors near the wheels lead to the central control unit.

An object of the invention is to provide an improved device for ABS-integrated brake pad wear indication in a motor vehicle, which device has a high electromagnetic compatibility (EMC), but is nevertheless cost effective.

This object has been achieved in accordance with the present invention by a device in which lines combined or laid in a single strand, wheel by wheel are connected with a single terminal plug-in connector of a brake control unit containing the microcomputer. An instrument cluster is arranged in a vehicle dashboard and associated with said devices for indicating at least one of fault states and wear, with reference to their drive. The instrument cluster is connected to the brake control unit via only a single signal path which leads via a single terminal plug-in connector, and state and/or warning signals are transmittable from the brake control unit by one of pulse width modulation and per protocol to the instrument cluster which comprises at least one dedicated microcomputer which performs one of the pulse width demodulation and protocol demodulation and driving of associated displays.

The device according to the present invention has the advantage that, in conjunction with a simultaneous cost reduction, there is a substantial suppression of EMC interference without the need for appreciable structural modifications to known ABS or ABS/ASR control units. A high EMC interference suppression is achieved essentially by constructing all the line paths with simultaneous avoidance of current loops and induction surfaces. In addition, the wheel speed and pad wear signal lines are respectively fed to the ABS or ABS/ASR control unit in a single strand or combined at least via common fixings, grommets, intermediate connecting plugs and a single terminal connecting plug. Owing to coding of different warning signals for, e.g., ABS, ASR and brake pad wear, the connection between the ABS or ABS/ASR control unit and the instrument cluster is reduced to a single line.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
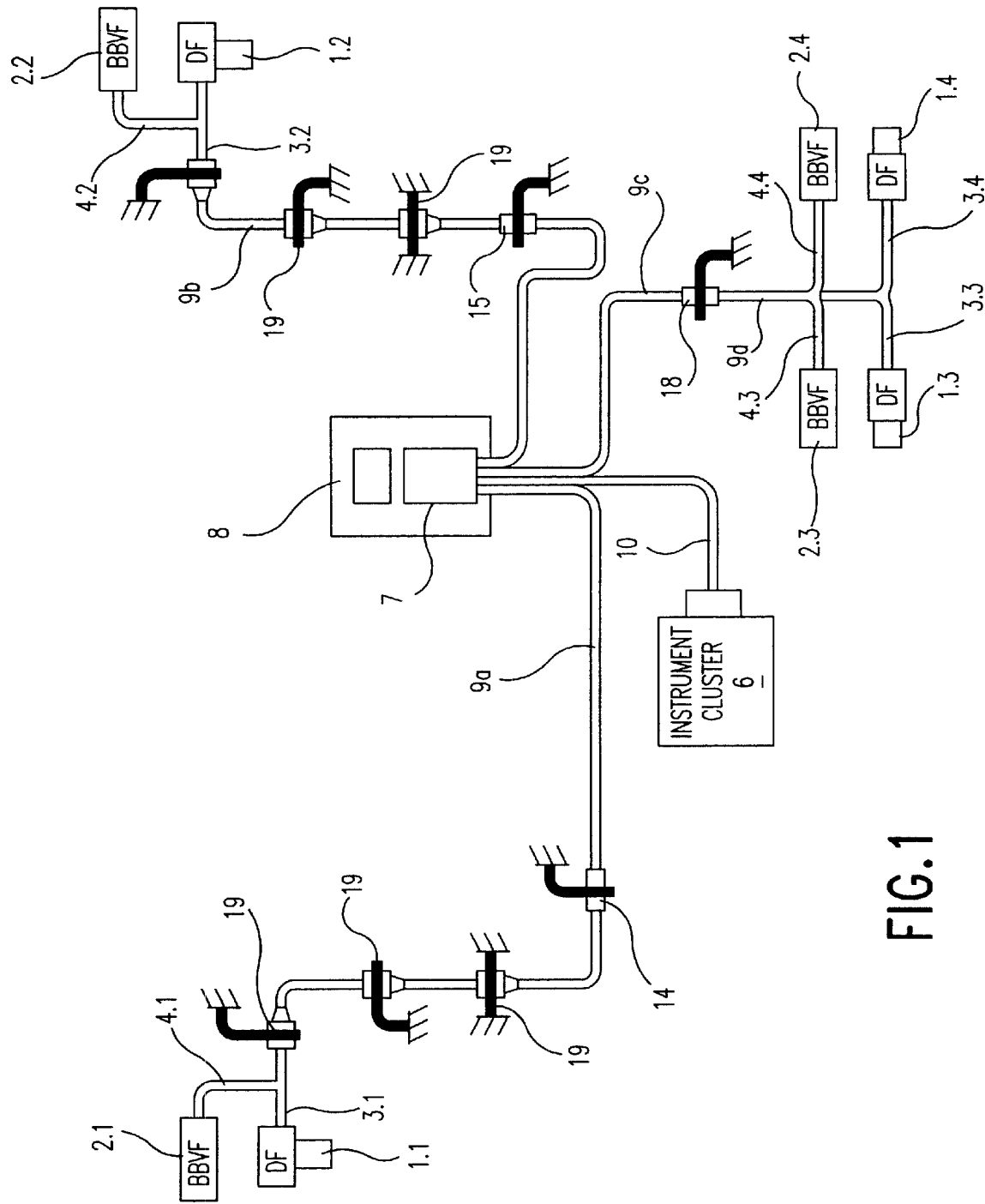
FIG. 1 is a schematic circuit diagram of the device according to the present invention.

Referring now to FIG. 1, speed sensor lines and brake wear sensor lines are laid in strands. The speed sensor line 3.1 of the speed sensor 1.1 and the brake wear sensor line 4.1 of the pad wear sensor 2.1 are thus combined to form a line strand 9a. The speed sensor line 3.2 of the speed sensor 1.2 and the brake wear sensor line 4.2 of the pad wear sensor 2.2 are combined to form a line strand 9b. The speed sensor lines 3.3 and 3.4 of the respective speed sensors 1.3 and 1.4, and the brake wear sensor lines 4.3 and 4.4 of the respective pad wear sensors 2.3 and 2.4 are combined to form a bus line strand 9c and 9d respectively, by or via in each case common grommets, fixings and holders 19 and, if necessary, are also led via common intermediate plug-in connectors 14, 15 and 18 of the respective strand.

In addition, only one further single signal path 10 exists between the instrument cluster 6 and the ABS or ABS/ASR control unit 8. This signal path 10 to this extent likewise ends in the plug-in connector 7. In this way, it is only additional cable strands (e.g., four in the illustrated embodiment) which proceed in the shape of a star from the plug-in connector 7, and to that extent from the ABS or ABS/ASR control unit 8. These strands neither inherently nor mutually define EMC-critical induction surfaces or magnetic blocking surfaces. The resistance to irradiation by EMC interference is thereby drastically increased.

Figure 2:
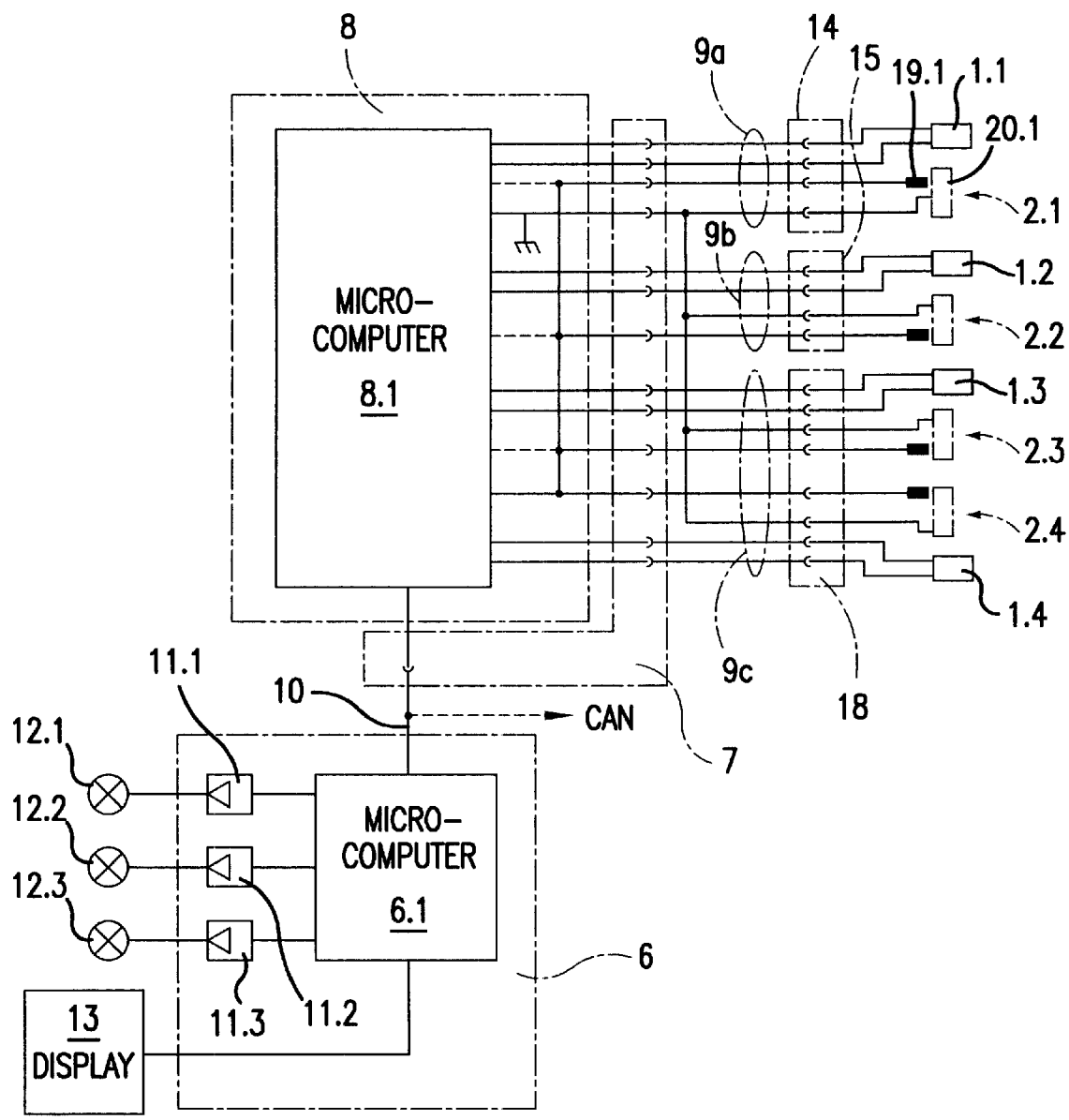
FIG. 2 is a block diagram of the device according to the present invention.
Figure 3:
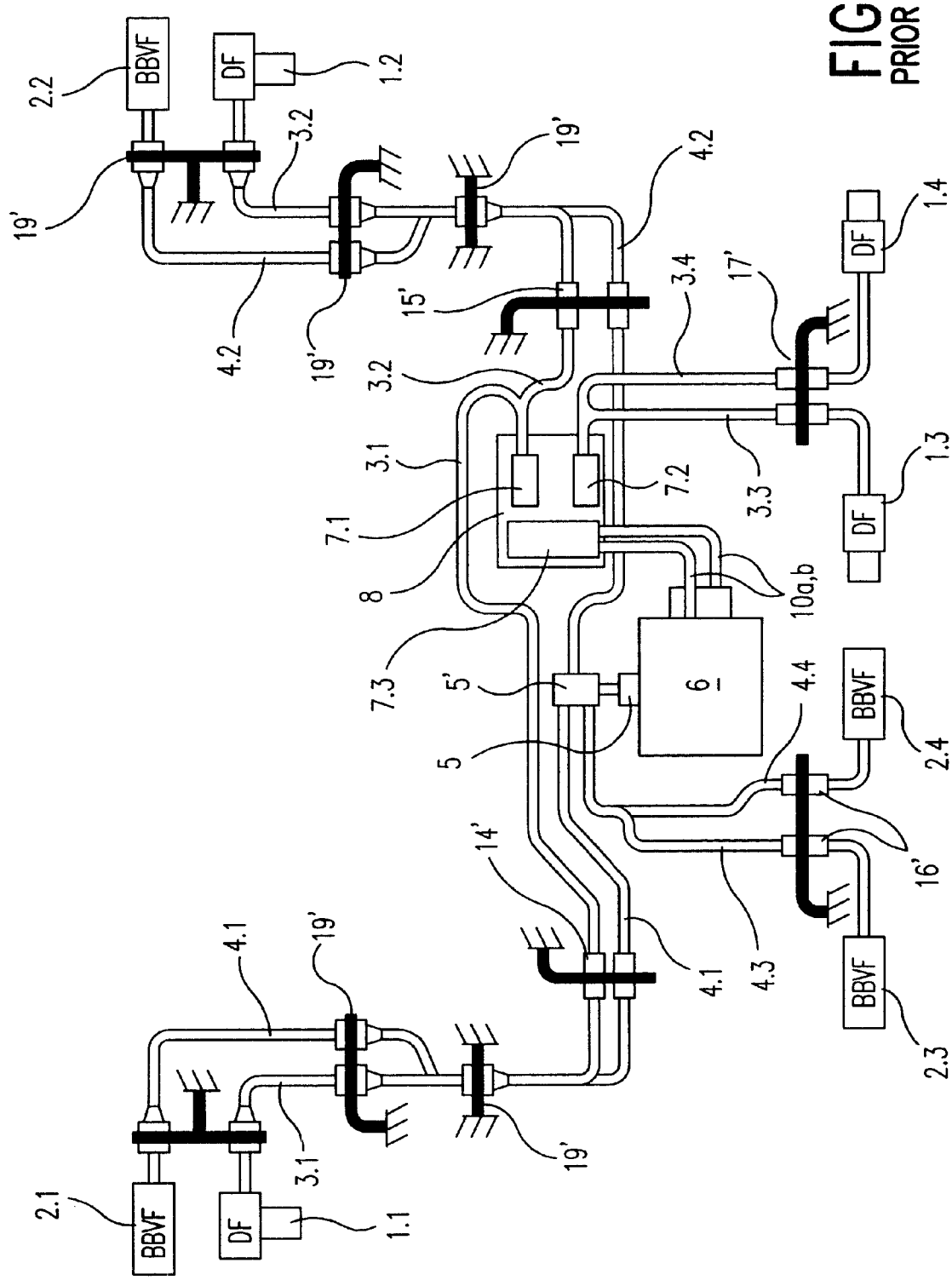
FIG. 3 is a schematic circuit diagram of a conventional device for indicating brake wear.

The electric circuit schematically shown in FIG. 2 is based, for example, on a known brake pad wear transmitter of the contact type. The brake pad wear transmitter 2.1 consists in principle of a contact recessed into the insulating brake pad 19.1, and of the brake disc or brake drum 20.1 which is conductive and at frame potential. As soon as the insulating brake pad has worn so far that the contact is exposed, the latter comes into contact with the brake disc, which is at frame potential, and thus produces a short-circuit frame which can be evaluated (low signal)

As already illustrated in FIG. 1, the lines 9a, 9b and 9c are, for example, led via respective intermediate plug-in connectors 14, 15 and 18, (preferably via a known port input protection and filter circuit (not shown) for the purpose of further EMC interference suppression, to input ports of the microcomputer 8.1 in the ABS or ABS/ASR control unit 8.

The instrument cluster 6 has its own microcomputer 6.1 which can fulfil several functions there and is connected to the control unit 8 via only a single communication line 10. This can also, for example, be a serial bus, for example a CAN bus, to which it is also possible to this extent further to connect many other appliances in the vehicle.

Via driver amplifiers or driver switches 11.1, 11.2 and 11.3, the microcomputer 6.1 drives warning signal transmitters 12.1, 12.2 and 12.3 for indicating fault states in the ABS and/or ASR system, or for indicating service information. It is also possible in parallel with the transmitters to provide driving of a more informative display 13. In the illustrated embodiment, the brake pad wear transmitters 2.1 and 2.4 are connected in parallel with reference to the microcomputer 8.1. Nevertheless, it is also possible, without restricting generality, for the brake pad wear transmitters likewise to be led, in a manner analogous to the wheel speed sensors 1.1 to 1.4 and as represented by dashes, to individual input ports of the computer 8.1 for the purpose of individual evaluation. This is particularly appropriate when the instrument cluster 6 has the display 13 on which it is then also possible to represent symbolically the wheel on which pad wear has been detected.

The brake pad wear signal is preferably transmitted from the computer 8.1 to the instrument cluster 6 using pulse width modulation or by a simple unidirectional protocol. It is thus also possible for the instantaneous braking path, the mean delay and/or also the output rate to be co-transmitted and indicated on the display 13. Such a data transfer is likewise also possible between the ABS or ABS/ASR control unit 8 and the instrument cluster 6 if the connection of the same is implemented via a bus having an omnidirectional communication possibility and which provides special priority planes by a protocol for time-critical indications.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A device for ABS-integrated brake pad wear indication in a motor vehicle, comprising a central ABS or ABS/ASR microcomputer configured to be supplied with wheel speed signals and brake pad wear signals from wheel sensors, means for indicating at least one of fault states and brake pad wear such that, at least wheel by wheel, fixed, single strand lines which transmit wheel speed signals and brake pad wear signals to the microcomputer are selectively plugged in, and are led to a single terminal plug-in connector of a brake control unit containing the microcomputer, and an instrument cluster arranged in a vehicle dashboard and being associated with said means for indicating at least one of fault states and wear, wherein the instrument cluster is connected to the brake control unit via only a single signal path which leads via a single terminal plug-in connector, and state and/or warning signals are transmittable from the brake control unit by one of pulse width modulation and per protocol to the instrument cluster which comprises at least one dedicated microcomputer which performs one of the pulse width demodulation and protocol demodulation and driving of associated displays.

2. The device according to claim 1, wherein a serial bus is provided for connecting the ABS or ABS/ASR microcomputer and the instrument cluster, and additional control units in the vehicle are also connected to the serial bus.

3. The device according to claim 2, wherein the serial bus is a CAN bus.

\* \* \* \* \*